April 6, 1971  W. R. LAMPERT  3,574,022
CONVEYING OR DRIVING BELT AND METHOD FOR MAKING SAME
Filed Feb. 19, 1968

Inventor:
WALTER R. LAMPERT
BY
Cushman, Darby & Cushman
ATTORNEYS

3,574,022
CONVEYING OR DRIVING BELT AND METHOD FOR MAKING SAME
Walter Rudolf Lampert, Hamburg, Germany, assignor to H. Rost & Co., Hamburg, Germany
Filed Feb. 19, 1968, Ser. No. 706,347
Claims priority, application Germany, Feb. 23, 1967, R 45,354
Int. Cl. D06c 25/00
U.S. Cl. 156—88  14 Claims

ABSTRACT OF THE DISCLOSURE

A multi-layer conveyor or drive belt and a process of manufacturing the multi-layer belt which comprises utilizing a plurality of alternate fabric sheets and bonding material sheets or utilizing fabric sheets coated or treated with a bonding material, the fabric sheets being formed with wefts of fabrics, body warps of fabric and peripheral warps of a material which upon lamination of the sheets will fuse with the bonding material.

BRIEF DESCRIPTION OF THE INVENTION

This invention relates to the manufacture of multi-layer belts and the like.

Heretofore, conveyor or drive belts provided with tension-resistant cores composed of layers of fabric sheets united by natural rubber, synthetic rubber or a thermoplastic resin have posed a certain problem in that the fabric layers tend to be damaged along the longitudinal edges of the belt by mechanical action and fray with time.

In order to overcome this problem, a belt has already been proposed which provides a solid plastic strand of high tensile strength and abrasion resistance, e.g., of polyamide, polyurethane or polyester, that extends along the longitudinal edges of the fabric sheets and is enclosed with the fabric sheets within a cover plate. However, such belts are difficult to make and the strands have a tendency to be torn off.

A similar proposal involves the use of fabrics exhibiting the desired tension and abrasion-resistance and the bordering of their edges or the enclosing of the entire core but this proposal also is impractical and leads to difficulties, especially with regard to the formation of a satisfactory bond between the core and the cover plate.

Another proposal for improving the bond between polyurethane edge strands and the core or the cover plate involves utilizing an intermediate fabric (e.g., of cellulose, polyamide or metal threads) having an inner surface coated with a rubber-binding material to combine with the core and an outer surface to chemically combine with the polyurethane edge strands. These belts however still suffer from the above-mentioned problem, namely, the strips can be torn off. The cause of the problem in this instance may be due to the low impact resistance of polyurethane or to the presence of numerous bonds, unable to withstand the great mechanical stresses and the pulling forces imposed thereon, uniting surfaces composed of different materials.

The present invention is based upon a process utilizing the modification of the peripheral edges of the fabric sheets to minimize or eliminate the aforementioned problems experienced with conveyor or like belts manufactured according to the above discussed processes.

According to the invention, a multi-layer belt, such as a conveyor belt or drive belt, is manufactured from a blank consisting of layers of fabric sheets united by thermoplastic resin or rubber. The fabric sheets are formed with wefts of fabric, body warps of fabric and peripheral warps of a material which upon lamination will fuse with the thermoplastic resin or rubber. Preferably, the peripheral warps consist of plasticized polyvinyl chloride, above all in monofilament form; this is especially true when the blank has layers of thermoplastic resin, as is usually the case.

The process involves forming a blank by coating the fabric sheets with thermoplastic resin or treating them with rubber and then placing the sheets so treated one upon another or by the alternating of fabric sheets with intermediate and outermost sheets or layers of a thermoplastic resin or rubber, and then subjecting the blank so formed to lamination by heat and/or pressure. During the lamination step of the process, the thermoplastic resin (or rubber) present in the coating on the fabric sheets or in the layers intermediate the fabric sheets and the peripheral warps melts so as to fuse them together to define an integral margin within which the ends of the wefts are anchored. By this means, the weft ends which otherwise could be frayed are protected by the abrasion-resistant thermoplastic resin or rubber.

The belts of the present invention are to be distinguished from those of the prior art in that the edge material is not caused to adhere to a preformed belt either by uniting them in a common cover or chemically uniting them, but instead the edge material is made an integral part of the blank used to form the belt. In this way, the union of the edge material to the belt is made much stronger and is located precisely where needed.

This invention extends to multi-layer belts whenever manufactured in or by the process just described. The features and advantages of the present invention will be better understood from the following detailed description when taken in conjunction with the accompanying drawings in which.

DETAILED DESCRIPTION OF THE INVENTION

Figure 1:
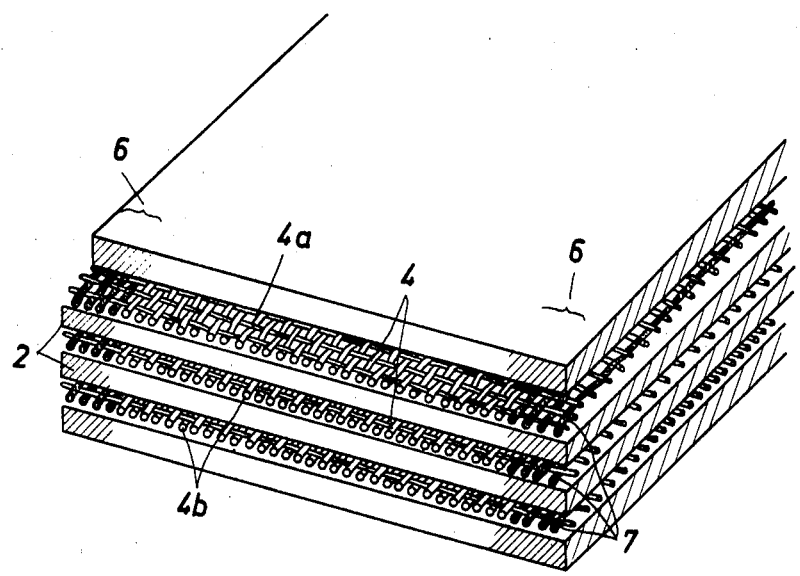
FIG. 1 shows a cross-section through a blank of a conveyor belt.

The blank shown in FIG. 1 consists of layers of thermoplastic resin 2 and alternating layers 4 of sheet fabric composed of warps 4a and wefts 4b. The marginal portions 6 of sheet fabric are provided with warps 7 of a material capable of being fused with the thermoplastic resin of layers 2, e.g., monofilaments of polyvinyl chloride, each having a thread thickness of 0.1 to 2.0 mm. The warps 7 are interwoven in the fabric in lieu of the usual warps 4a.

Figure 2:
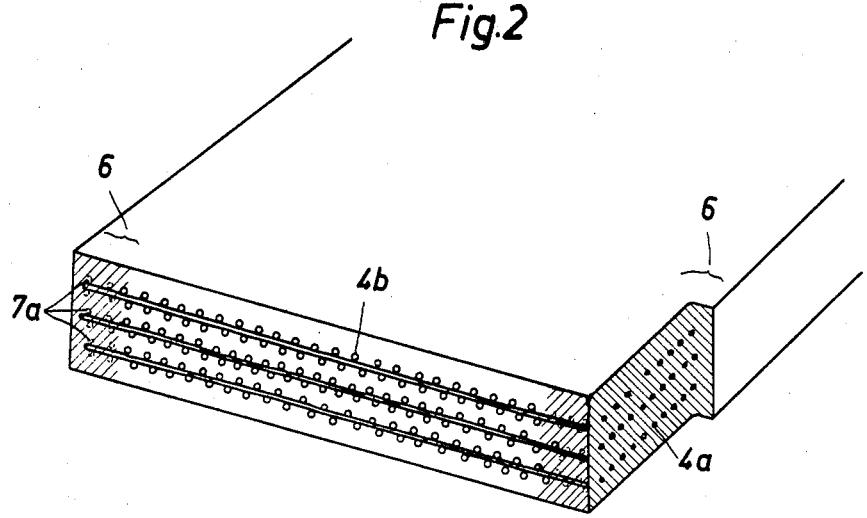
FIG. 2 shows a cross-section through the same belt after lamination.

In the process of the invention, the blank is subjected to lamination by heat and/or pressure to yield a conveyor belt as shown in FIG. 2. During lamination, warps 7 fuse with the thermoplastic resin of layer 2 to define an integral peripheral area 6 within which the wefts 4a of the fabric sheets 4 are anchored. Purely for purposes of illustration, the position of original warps 7 is shown in ghost outline under reference numeral 7a in FIG. 2 but in practice, it is not usually possible to distinguish them from the body of region 6.

The belt of FIG. 2 can also be formed in the following manner. Fabric sheets are coated with a thermoplastic resin or treated with a rubber solution, the fabric sheets being formed with wefts of fabric, body warps of fabric and peripheral warps of a material which will fuse with the thermoplastic resin or rubber. Preferably, the peripheral warps consist of plasticized monofilaments of polyvinyl chloride when the thermoplastic resin is used. A blank made up of layers of these coated or treated fabric sheets is then formed. The blank is subjected to lamination by heating and/or pressure to yield the conveyor belt as shown in FIG. 2. During lamination, the peripheral warps fuse with a thermoplastic resin or rubber to define an integral peripheral area within which the wefts of the fabric sheets are anchored.

Since the edges of the fabric sheet layers 4 are firmly anchored in the thermoplastic resin or rubber, the edges of fabric sheet layers in a belt made by the process of the present invention, unlike prior art conveyor belts, do not become damaged or frayed when used. In addition, since the peripheral area 6 is composed of a thermoplastic resin or rubber that is resistant to abrasion, the life of the conveyor belt is prolonged.

The belts of this invention can also be provided with a cover plate sheet of polyvinyl chloride or rubber on one surface, both surfaces or enclosing the core completely. In some cases, the marginal regions may additionally be covered with material reinforcements or coating strips. When using sheets of rubber for the cover plate, the warps consist of a material capable of combining with the rubber, e.g., a mixture of plastomers and elastomers, namely a so-called "hybrid material"; the same applies when in the reverse case a core combined by vulcanization is enclosed in a polyvinyl chloride cover.

According to a preferred form of the invention, a cover plate, when used to enclose the blank, is united to the blank in the following manner. The plurality of fabric layers are coated with a thermoplastic resin, treated with a rubber solution or intermediate layers of a plastic material are interposed between the fabric layers. The cover plate is then placed on the blank and united to the blank by heat and pressure which simultaneously effects the lamination of the layers in the blank.

While the preferred form of the invention has been shown and described, it is to be understood that all suitable modifications and equivalents may be resorted to which fall within the scope of the invention as claimed.

What is claimed is:

1. A process for manufacturing a multi-layer belt, said process comprising:
   providing sheets formed of wefts of fabric, body warps of fabric, and peripheral warps of a substance which will soften upon the application of heat and pressure,
   placing a bonding material between said sheets which will soften upon the application of heat and pressure, and
   applying heat and pressure to said sheets and to said bonding material to soften said peripheral warps and said bonding material and to substantially fuse one to the other.

2. A process as in claim 1 wherein said bonding material is in sheet form.

3. A process as in claim 1 wherein said bonding material is a rubber.

4. A process as in claim 3 wherein said peripheral warps comprise a mixture of plastomers and elastomers.

5. A process as in claim 1 wherein said bonding material is a thermoplastic resin.

6. A process as in claim 5 wherein said peripheral warps are comprised of plasticized polyvinyl chloride.

7. A process as in claim 6 wherein said peripheral warps are in monofilament form.

8. A multi-layer belt having peripheral edge portions on either side of a central mid-section, said belt comprising:
   at least one sheet of bonding material that will soften under heat and pressure,
   at least one sheet of woven web-like material,
   said web material comprising fabric wefts,
   said web material comprising fabric warps in said mid-section,
   said web material comprising peripheral warps in said peripheral edge portions formed of a material that would soften under heat and pressure, and
   said peripheral warps and said bonding material being substantially fused together in said peripheral edge portions.

9. A belt as in claim 8 wherein said peripheral warps comprise polyvinyl chloride.

10. A belt as in claim 8 wherein said peripheral warps comprise monofilaments of polyvinyl chloride.

11. A conveying or driving belt having a tension-resistant core of several fabric layers combined by a thermoplastic resin, said belt comprising:
    fabric layers having warps in their marginal regions made of a material capable of being fused together with said thermoplastic resin, and
    said warps being substantially fused together with said thermoplastic resin.

12. A conveying belt according to claim 11 wherein said warps in the marginal regions comprise a plasticized polyvinyl chloride.

13. A conveying belt according to claim 11 wherein said warps in the marginal regions comprise monofilaments of plasticized polyvinyl chloride.

14. A conveying belt having a tension-resistant core of several fabric layers combined by a thermoplastic rubber, said belt comprising:
    fabric layers having warps in their marginal regions made of a thread material capable of being combined with said rubber, and
    said warps in said marginal regions being substantially fused together with said rubber.

References Cited

UNITED STATES PATENTS

| | | | |
|---|---|---|---|
| 2,001,381 | 5/1935 | Davison | 156—88X |
| 2,578,889 | 12/1951 | Kennedy | 156—88X |
| 2,590,697 | 3/1952 | Grove | 156—88X |

BENJAMIN R. PADGETT, Primary Examiner

S. HELLMAN, Assistant Examiner

U.S. Cl. X.R.

156—137, 309; 198—190